United States Patent Office.

JEREMIAH DEAN, OF FREEPORT, ILLINOIS.

Letters Patent No. 68,051, dated August 27, 1867.

IMPROVED MEDICINE.

*The Schedule referred to in these Letters Patent and making part of the same.*

Be it known that I, JEREMIAH DEAN, of the city of Freeport, in the county of Stephenson, and State of Illinois, have discovered a new and useful Medicine for the Cure of Consumption and other Pulmonary Diseases; and I do hereby declare that the following is a full, clear, and accurate description of the medicine by me discovered, the manner of preparing or compounding it, the mode of administering it to the patient, and the name I have called it by.

The medicine consists in the extract of Indian gum, which is found in the rosin-weed, and is compounded with common sugar. The extract is procured from the buds of the plant, which are marked B in the accompanying drawing, during the months of July and August, or from the roots of the plant in the months of November and December, or at any time from the first of December until the stem reappears in the spring. The buds or the roots, as the case may be, contain a resinous gum which adheres with great tenacity to wounds. The extract is procured by boiling the buds or roots of the plant in soft water for the space of six hours, when the liquid is strained through a fine strainer. It is then boiled down to the consistency of a thin sirup, when sugar enough is added while boiling to preserve from fermentation. The liquid is then allowed to cool, when it is bottled, and it is then ready for use. The medicine is to be administered to adult patients, one tablespoonful morning, noon, and night; to children, one-half as much. The name I have given to the medicine is "Dean's Extract of Indian Gum."

I claim the medicine prepared substantially as herein described.

JEREMIAH DEAN.

Witnesses:
   THOS. J. TURNER,
   JAMES I. NEFF.